| United States Patent [19] | [11] Patent Number: 4,849,841 |
| Sokolik | [45] Date of Patent: Jul. 18, 1989 |

[54] TRANSDUCER HEAD CORE STRUCTURE WITH RECESSED MAGNETIC CLOSURES

[75] Inventor: Edmund L. Sokolik, Warren, Mich.

[73] Assignee: Irwin Magnetic Systems, Inc., Ann Arbor, Mich.

[21] Appl. No.: 36,915

[22] Filed: Apr. 10, 1987

[51] Int. Cl.⁴ .......................... G11B 5/23; G11B 5/147
[52] U.S. Cl. ..................................... 360/119; 360/122; 360/126
[58] Field of Search ............... 360/125, 126, 118, 119, 360/120, 121, 123

[56] References Cited

U.S. PATENT DOCUMENTS

| 2,852,617 | 9/1958 | Thiele | 360/120 |
| 3,114,011 | 12/1963 | Shirakura | 360/119 |
| 3,171,107 | 2/1965 | Rogers, Jr. | 360/119 |
| 3,303,292 | 2/1967 | Bedell, Jr. et al. | 360/125 |
| 3,353,168 | 11/1967 | Poumakis | 360/121 |
| 3,384,881 | 5/1968 | Frost et al. | 260/125 |
| 3,536,857 | 10/1970 | Kohl | 360/119 |
| 3,668,332 | 6/1972 | Anderson | 360/121 |
| 3,855,629 | 12/1974 | Koorneef et al. | 360/113 |
| 4,085,429 | 4/1978 | Hasegawa | 360/119 |
| 4,100,584 | 7/1978 | Behr et al. | 360/125 |
| 4,110,804 | 8/1978 | Castrodale et al. | 360/118 |
| 4,205,356 | 5/1980 | Tanaka et al. | 360/118 |
| 4,300,179 | 11/1981 | Barnes et al. | 360/127 |
| 4,405,959 | 9/1983 | Chabrolle | 360/119 |
| 4,602,307 | 7/1986 | Toriu et al. | 360/125 |
| 4,672,494 | 6/1987 | Furuya et al. | 360/125 |

FOREIGN PATENT DOCUMENTS

| 174714 | 3/1986 | European Pat. Off. | 360/125 |
| 210164 | 7/1960 | Fed. Rep. of Germany | 360/125 |
| 52-35616 | 3/1977 | Japan . | |
| 58-171710 | 10/1983 | Japan . | |
| 575680 | 11/1977 | U.S.S.R. | 360/125 |

*Primary Examiner*—John H. Wolff
*Assistant Examiner*—Matthew J. Bussan
*Attorney, Agent, or Firm*—Price, Heneveld, Cooper, DeWitt & Litton

[57] ABSTRACT

A magnetic core structure for a transducer head of the type used in digital data storage devices is wider on one side of the magnetic gap (e.g., the write side) than it on the other side of the gap (e.g., the read side), to provide "wide write-arrow read" recording and reproducing capabilities. Magnetic flux return during recording (writing) operations is accomplished through the comparatively narrow read core plus additional magnetic closure elements which are disposed alongside, and which magnetically shunt, the read core, such that the overall core structure has basically the same width on each side of the magnetic gap. Improved transducing performance is provided by using additional thickness for such magnetic shunts and recessing the end extremity of the latter adjacent the gap at the face of the head, where the head accesses the magnetic recording media, such that the overall magnetic reluctance of the magnetic returns (i.e., shunts) is lowered but the effective gap width of the head is not changed.

17 Claims, 2 Drawing Sheets

TRANSDUCER HEAD CORE STRUCTURE WITH RECESSED MAGNETIC CLOSURES

CROSS-REFERENCE TO RELATED APPLICATION

This application is related to co-pending application Ser. No. 915,734, filed Oct. 6, 1986, now U.S. Pat. No. 4,819,107, by my co-worker, Michael L. Bolt, and having common ownership therewith.

TECHNICAL FIELD

This invention relates generally to the field of magnetic recording, and more particularly to transducer structures used for magnetic recording and reproducing ("read/write") operations. Still more particularly, the invention relates to magnetic transducer core structures which are particularly useful in digital data-storage devices, especially (but not exclusively) tape recorder devices ("tape drives") of the type used in data-storage applications.

BACKGROUND OF THE INVENTION

Most data storage and retrieval is done by use of magnetic recording apparatus, mainly disc drives and tape drives. In the case of disc drives, there are both "hard" disc and "floppy" disc-type media, the "hard" disc being a rigid platter having a magnetizable surface upon which magnetic flux transitions are recorded by means of a transducer head which aerodynamically "flies" over the surface of the disc, spaced therefrom by a thin film of air. "Floppy" disc drives utilize recording media which is much more in the nature of magnetic tape, being highly flexible. Thus, in floppy disc drives as well as tape drives recording is accomplished by maintaining direct contact between the moving media and the recording head, usually by projecting the tip of the head (at the magnetic "gap") into the plane of the flexible media as it moves past the head. However, tape drives frequently feature bi-directional recording and reproducing operation, and this is not characteristic of disc drives, in which the disc-form media is continuously rotated in the same direction and all recording or reproduction on the media is done unidirectionally.

These fundamental differences in operational characteristics create corresponding fundamental differences in the nature of the transducers or heads which may be utilized, and in order to maximize the likelihood that the read gap will be properly positioned directly over the written track on the media two essentially opposite approaches have come to be recognized in the art with respect to the heads used in tape drives. The first of these involves use of a write gap which is substantially wider than the read gap, such that if the head is anywhere near a centered position with respect to a written track, the read gap is likely to be fully registered with the track, i.e., the recorded transitions will extend across the entire height (i.e., length) of the read gap. The second such approach involves use of a head having a separate erase gap disposed ahead of (i.e., upstream from) the write gap, so that the media is erased cleanly before each writing operation takes place; thus, the writing is always accomplished on media having no residual signals. In this arrangement, a read gap is used which is considerably wider than the written track, so that the entire width of the written track is always likely to be completely straddled by the read gap. Since the separate erase gap eliminates all residual or extraneous signals recorded contiguous to the narrower written track, interference, cross talk and the like will not be present in the read data stream.

Since the approaches just described can only be accomplished with multi-gap heads, they are not utilized in floppy disc drives and many tape drives, where single-gap read/write heads are used. In order to provide a system somewhat analogous to those utilizing separate erase gaps disposed ahead of the write gap, some of these drives utilize a "tunnel erase" concept, in which separate erase gaps are provided on both sides of, and to the rear of, the single read/write gap. The function of the two such erase gaps is to "trim" the marginal edges of the written data track by erasing along both sides thereof, thus producing a resultant narrowed track of written data, the sides of which have no residual or extraneous recorded transitions. In this arrangement, the head structure is somewhat complex since it is necessary to space the erase gaps rearwardly of the read/write gap in order to eliminate or minimize both mechanical and magnetic interference problems, and of course there is the added requirement and expense of providing, and assembling, two separate erase gaps. Furthermore, the tunnel-erase concept is not advantageous in bi-directional recording operations, since that would inherently necessitate the addition of a second pair of erase gaps, spaced on the opposite side of the single read/write gap from the location of the first such set of erase gaps, in order to accommodate both of the possible mutually-opposite recording directions.

In an effort to provide a solution for the difficulties and problems discussed above, it has heretofore been proposed to use a different form of core structure for such transducer heads, which in effect provides operational characteristics functionally representative of those typically found in multi-gap heads, while nonetheless having in fact only a single read/write gap. More particularly, it has been proposed in the past to use a transducer head whose magnetic core structure has a full-width write core disposed on one side of the gap and a partial-width read core on the opposite side of the gap. In this structure, special additional magnetic closure or return pieces are disposed on opposite sides of the comparatively narrow read core at the gap, to in effect fill the space created by narrowing the read core. These additional components serve as part of the write core structure during write procedures but are not intended to contribute to the read core output signal appearing on a sense coil accessing only the read core. For examples of such transducer core structures, reference is made to Japanese Patent Publications Nos. 50-111817 (Pat. No. 5235618) and 58-171710 (Patent Abstracts Vol. 8, No. 10, P. 248), as well as U.S. Pat. No. 4,085,429.

The last-mentioned of the above disclosures discusses the overriding importance of obtaining the most favorable signal-to-noise ratios possible in using such special-purpose transducers, and of isolating the read channel from the write channel therein, and this prior patent is predicated upon the use of certain allegedly critical limitations for the thickness, with respect to the magnetic gap, of isolation layers proposed for use between the narrowed read core and the special additional write core closures disposed on opposite sides of the read core. Notwithstanding this particular factor, however, the prior efforts of others in the field have until now failed to appreciate and take into consideration certain other highly significant factors involved in the special-purpose transducer-head core structure used in such heads which have a very significant effect upon the relative isolation of the write closure from the read core, and the present invention is based on, and provides recognition and disclosure of, certain of these important factors.

Accordingly, the present invention provides new and important structural features and arrangements for a "wide-write, narrow-read" core structure, involving improvements which are of substantial importance in connection with high-density recording operations, and which may in fact ultimately make the difference between successful and unsuccessful high-density recording operation, bearing in mind the underlying requirement that in actual operation digital data recording for data-processing purposes must be substantially free from spurious error and consistently reliable in performance.

Broadly considered, the present invention provides structural improvements and design criteria for "wide-write, narrow-read" magnetic transducer core structures which make possible high-density recording operation with attendant low error rates. More particularly considered, the invention achieves these advantages by providing important structural and positional relationships in the elements comprising the magnetic core; more particularly still, the invention provides certain important size and positioning relationships in the general area of overlap between the read core and the special write core closures, which, when carried through by the incorporation of certain preferred arrangements of the special write core closures (laminar elements at times referred to as "strata"), provide the consummately desirable operational results just noted.

The foregoing generalized features of the invention will become more apparent following due consideration of the ensuing specification and the appended drawings, in which a preferred embodiment is disclosed to illustrate the underlying concepts and the overall aspect of the invention.

DESCRIPTION OF PREFERRED EMBODIMENTS

Figure 1:
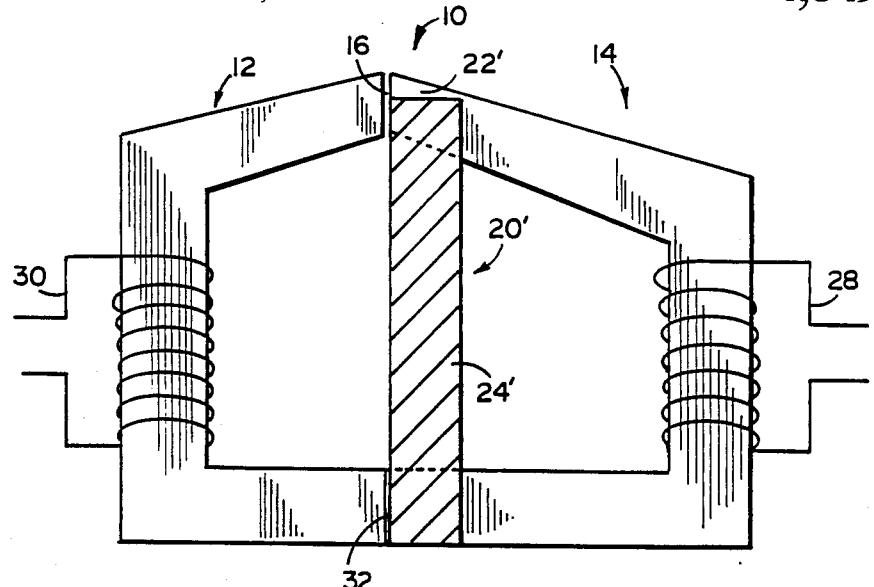
FIG. 1 is a pictorial, schematic representation of a sectional, overhead plan view of a transducer head core structure in the invention, taken along the plane I—I of FIG. 2 and viewed in the direction of the arrows.
Figure 2:
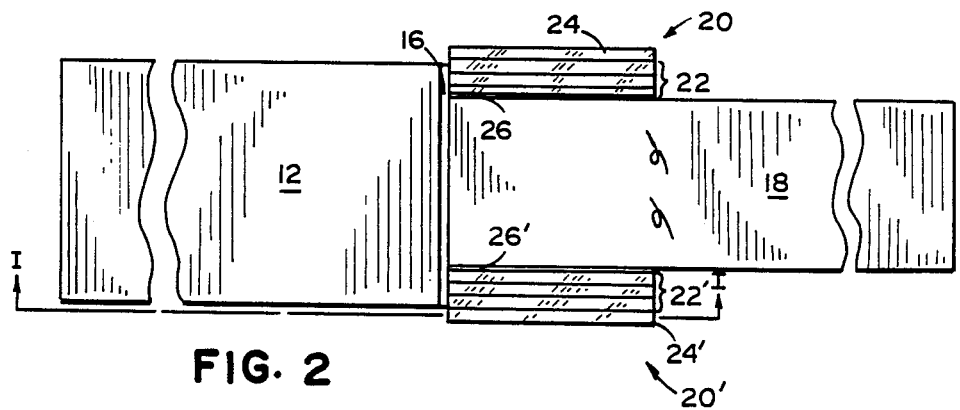
FIG. 2 is an enlarged, fragmentary, front-elevational view of the core structure shown in FIG. 1.

Referring now in more detail to the drawings, FIGS. 1 and 2 show the overall nature of a transducer head core structure 10 in accordance herewith. As illustrated in these Figures, the core structure 10 includes differently-structured parts, e.g., lateral "halves" 12 and 14 (the term "half" not being used in a specific quantitative sense). Considering the left half or portion 12 of the core structure as being the "write" portion, it will be seen that this part of the core constitutes a single pole member whose height (thickness) is at least the full height of the transducing gap 16.

The other "half" 14 of the core structure 10, appearing at the right side of the transducing gap 16, is not a single monolithic structure like the write core 12, but is instead composite in form, including (in this particular embodiment) three basic component parts disposed in stratified or laminar form. These component parts, generally designated by the numerals 18, 20 and 20', include two essentially identical outermost (side) portions 20, 20', which members comprise closures (returns) for the write core 12, whereas the central or medial layer or part 18 comprises the read core.

As discussed more fully below, the write core closures 20, 20' of the particular embodiment under discussion are identical to one another and disposed on opposite sides of the read core 18. It is extremely important for each of the read core 18 and the write closures 20, 20' to be separated, i.e., magnetically isolated, from one another. For this reason, non-magnetic isolation members 26 and 26' are disposed between and preferably extend at least slightly beyond the boundaries of the write closures. It is to be expressly noted that, notwithstanding the particular example just described, the read core 18 need not necessarily be centered, and could instead be disposed in other relative positions, including those corresponding to either end of the gap. Thus, the terms "central" and "medial" are used in a very general sense, as is of course also true with respect to such terms as "upper," "lower," "end," and "flanking."

With reference to FIG. 1, it will be seen that the core structure 10 may be generally C-shaped in its overall configuration, forming the recording gap 16 at the opening between two converging face portions which basically define what is commonly referred to as the "cutback angle." Bearing in mind the relative height of the different layers or components, as shown in FIG. 2, it will be seen from FIG. 1 that the main write core 12 extends rearwardly from gap 16, has an electrical excitation or drive winding (a "write coil") 30 wound about an intermediate portion of it, and extends back toward and into contact (or other magnetic communication) with the other half 14 of the overall core structure at a boundary or junction 32. At this rearward location, the three main elements, (i.e., "strata") 18, 20 and 20' located on the opposite side of junction 32 from write core 12 have essentially the same height relationship as they do near the transducing gap 16, although the actual height relationship of the write closures 20 at the recording gap preferably varies in accordance herewith, as described more fully hereinafter.

As illustrated, in the "write-wide, read-narrow" head configuration, the upper and lower strata 20 and 20', i.e., the group of write closures, extend rearwardly from the transducing gap 16 in a much more direct manner than is true of the inner or medial strata constituting the read core 18, which has a configuration in plan which is essentially a mirror-image to that of the write core portion 12 described above (FIG. 1). Also, the read core 18 has an electromagnetic coil 28 wound about it at an intermediate location, which in accordance with the embodiment under discussion constitutes a read sense coil.

A transducer head structured generally in accordance with the foregoing provides the anomalous result of non-symmetric write/read width characteristics in a single-gap core and head. In the particular format generally referred to above, the write core 12 is configured, by its size and shape at the magnetic gap 16, to write a track of magnetic transitions which are essentially as wide as the full length of the gap, i.e., the full width (thickness) of core portions 18, 22 and 22', plus that of the isolation members 26 and 26'. On the other hand, the much narrower read core 18 is configured to read a track width much narrower than the write core. Consequently, the overall head structure in the arrangement noted constitutes a head of single-gap configuration which writes a wide track but reads a narrow one.

Somewhat more particularly, it will be seen from the above that excitation of the write coil 30 with electrical signals will create corresponding magnetic flux patterns within the core structure 10, travelling around the path so defined and across the transducing gap 16, at which position the width of the flux at the gap is actually a function of the height or width of the write core 12 together with the height or width at the gap of the different strata comprised by read core 18 and write closures 20, 20' constituting the opposite core half 14, i.e., essentially the same width as the write core 12. As a result, a recorded track of the same width is written on the media moving across the gap. As a direct and integral part of such recording, the magnetic flux which moves across the gap 16 from core 12 to core 14 is actually returned across the rear portion of the core (i.e., across the boundary 32) by all three of the layers or components 18, 20 and 20'.

In the data-transducing "read" mode, the magnetic circuit performance is different from that just described for write operations, due to the relative configuration of the core half 14 and the position of the read coil 28 thereupon. That is, the read coil 28 is wound upon only the centrally-disposed read core element 18, and not on either of the outer layers 20 and 20' which flank the read core; consequently, the components 20 and 20' function only as write closures. Thus, with the read core 18 disposed in coaxial alignment with a written track on the media, the read core pole piece at gap 16 will be aligned over only the center portion of the written track on the media, and will thus access considerably less than the full width of the magnetic transitions recorded on the media. Accordingly, the magnetic flux flowing through the read core strata 18 to the read sense winding 28 and to rear boundary or junction 32 will be substantially less than the total magnetic flux present at the gap, the write closures 20 and 20' (i.e., the "peripheral" or "flanking" strata) serving in effect to shunt away from the read core a selected portion of the total magnetic flux which is not desired to be represented in the output (i.e., not desired to be "read"). Accordingly, a wide-write, narrow-read capability is provided, even though the head has but a single magnetic gap.

As indicated above, the selectively separate performance of the read core structure in relation to the write core structure of the disclosed apparatus is of primary importance in satisfying the desired objective. If read and write performance are truly separate and distinct from one another, a number of significant advantages are provided, including for example greater immunity from the signals recorded on adjacent tracks, greater immunity from over-written signals, greater immunity to tape jumps or other movement, and reduced sensitivity to track-following errors. In large part, however, realization of these advantages resolves itself down to the degree to which effective isolation is achieved between the two different core "halves", particularly during "read"-type transducing operation, when it is typical to encounter magnetic transitions on the recording media in proximity with the write closures 20 and 20' which are not desired to be reproduced in any manner. For example, such transitions may simply comprise "noise" of undetermined origin, or unerased previously-recorded data, "over-write," or adjacent track noise, etc. Of course, since the read sense winding 28 is disposed about only the read core ("medial strata") 18, and not about the write closures 20, 20', ("flanking strata"), the effect of flux transitions encountered at the gap 16 by the write closures will not induce a corresponding sense voltage in the read winding 28; nonetheless, it will be evident that "cross talk" or coupling may result in a number of ways, which generally may be considered as "leakage" between the corresponding read and write portions of the core structure, mutual inductance, etc.

In point of fact, effective isolation between the write closures 20, 20' and the read core 18, respectively, is essential in order to limit the effects of such "noise" to the greatest extent possible. This is particularly true where high-density digital recording is to be accomplished and, as is well known there appears to be a constant and continuing desire for ever-greater recording densities in order to maximize data storage in relation to the physical size of the media. Whereas the isolation of these read and write core components has been largely overlooked by others heretofore, however, the aforementioned U.S. Pat. No. 4,085,429 provides for the use of isolating (non-magnetic) layers at the locations which have been identified; however, the entire thrust of this patent is that in order to be effective the thickness of such isolation layers in relation to recording gap width is a critical relationship, and this prior patent states a requirement for a very specific range of such thickness in terms of the recording gap width.

The present invention is based upon different and alternative concepts from those just noted, which have heretofore gone unrecognized. More particularly, with reference to FIGS. 2, 3 and 4, it will be noted that the write closures forming the "flanking strata," designated generally by the numeral 20, actually include several distinct and different component pieces. These include a number (here shown as three) of substantially identical, superimposed closure strips or elements 22 which are disposed immediately atop the isolation layer 26, together with one or more additional closure strips 24, 24' which are positioned somewhat differently from closure strips 22.

Figure 3:
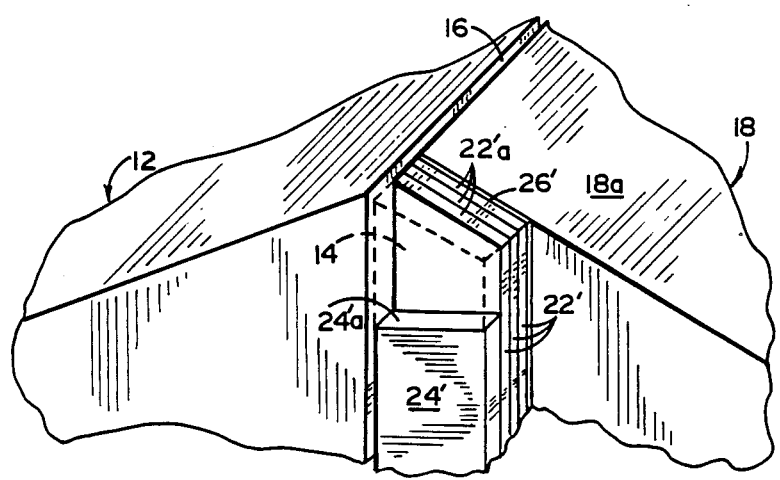
FIG. 3 is a further enlarged, fragmentary, perspective view of one embodiment of the core structure shown in FIG. 1.
Figure 4:
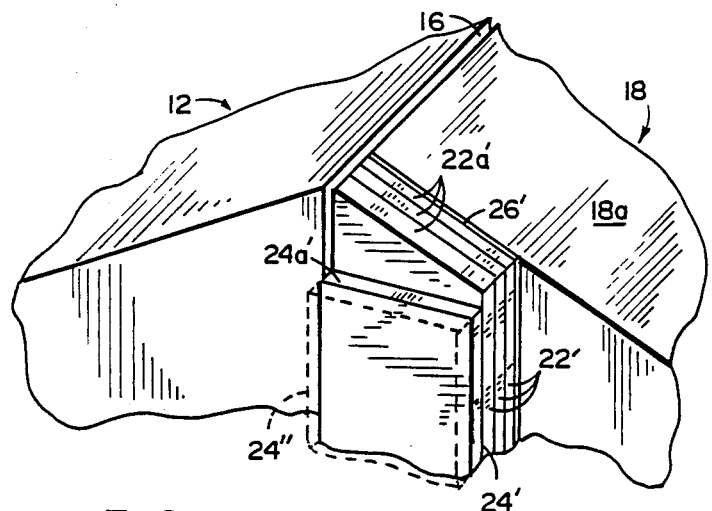
FIG. 4 is a fragmentary, perspective view similar to FIG. 3 but showing another and preferred embodiment of the invention, as also illustrated in FIG. 2.

As illustrated in FIGS. 3 and 4, closure strips 22 have angularly-sloping end portions which are complementary to and symmetrical with the adjacent sloping face of the read core 18. In the embodiment shown in FIG. 3, the closure strips 22 do not completely fill the space along the outer surface ("face") of gap 16 provided by the reduced width of the read core 18. This remaining spacing is filled by the additional write closure strip 24, which is disposed immediately atop the outermost closure strip 22; however, it will be noted that the end extremity 24a of write closure 24 is recessed from the angled faces of both read core 18 and closure strips 22, which approach and define the face of gap 16. Furthermore, end face 24a of closure strip 24 is not angled like the faces 22a of closure 22. Accordingly, the relative configuration of closure strips 22 and 24 leaves a generally triangular (actually, preferably trapezoidal) open area 34, which is outlined in phantom in FIG. 3; thus, the overall thickness of the flanking strata 20, 20' formed by the stacked closure strips 22 and 24 is greater rearwardly of the face of the head than it is along the face. In accordance with the present invention, this area is filled with non-magnetic material, which may in the simplest case simply be air, but is preferably a diamagnetic substance such as copper, etc.

A variation on the structure shown in FIG. 3 and just described, constituting an alternative and preferred embodiment, is illustrated in FIG. 4. In this configuration, it will be noted that a series of write closures 22' are utilized alongside the narrowed read core 18, in much the same manner as is true in the embodiment of FIG. 3, but that the closures 22' of FIG. 4 completely fill the space created by the narrowed read core. Once again, at least one additional outer closure strip 24' is utilized, (although at least one more may also be used, as shown in phantom. Once again, the end face 24a' is preferably blunt or right-angled, rather than angularly sloping like the adjacent faces 22a' presented by the closure strips 22; however, in this case it is perhaps not essential (even though desirable), to fill the trapezoidal area between end face 24a' and the adjacent end faces 22a' with non-magnetic material.

As will be appreciated, the write closures 22 and 24 are all of magnetic material and are stacked adjacent one another in direct contact, having no isolation material between them comparable to the layer 26 which is provided between the write closures 22 and the read core 18, as described above. Consequently, the write closures 22 function together to carry magnetic flux present at the end of the gap 16, as a counterpart to the full width of the write core 12. The additional closure elements 24 are also in magnetic communication with the closure elements 22, but due to the recessed location of their end face 24a, these additional closure strips do not affect or change the effective gap width; i.e., the presence of the additional closure members 24, 24' do not cause any significant widening of the track written by the transducer having such a core structure. On the other hand, the additional closures 24, 24' do have a very significant effect on the overall magnetic performance, since they lower the effective reluctance of the overall write closure structure, in effect acting in the same manner as resistances added in parallel.

Figure 5:
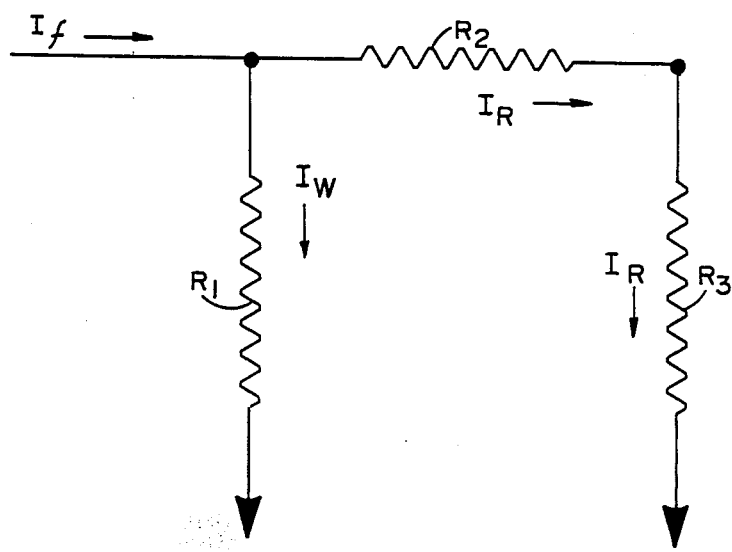
FIG. 5 is a schematic representation showing the equivalent magnetic circuit for the core structure shown in the other Figures.

The effect of the write closure structure just described may be further understood and appreciated by reference to the simplified circuit shown in FIG. 5, which represents the magnetic flux flow in the core structure 10. In this schematically shown circuit, the label "$I_f$" designates total flux flow in the magnetic circuit, and is comprised of two component branches $I_w$ and $I_r$, which represent the flux flowing through the write closures and read core, respectively. In this equivalent circuit, the magnetic reluctance of the corresponding core parts is represented as resistance elements, the element $R_1$ being the combined reluctance of the write closure elements and the elements $R_2$ and $R_3$ representing the reluctance of the isolation layers 26 and of the read core 18, respectively.

From the foregoing, it will be seen that the degree of isolation in the disclosed multi-component core structure is a function of the magnetic reluctance of the write closures (i.e., $R_1$) in relation to the reluctance attributable to the read core structure, including the read core itself and the isolation layer 26 (as represented by $R_2+R_3$). Accordingly, an effective way of increasing such isolation would be to increase the relative amount of flux passing through the write closure; however, this is not merely a matter of increasing the relative size of the write closure members since in the first place the read gap and write gap parameters are determined by other considerations. Furthermore, as set forth in the aforementioned related application (Ser. No. 915,734 now U.S. Pat. No. 4,819,107), it is desirable to limit the area of overlap between the write closures and the read core, since this in itself increases the degree of effective isolation.

Decreasing the reluctance of the write closure structure in the manner taught above thus becomes a highly effective but previously unappreciated way of achieving the desired additional isolation of write core structure from read core structure, and as has already been indicated, this is accomplished without significantly changing the effective gap length.

As a more explicit illustration of the concepts set forth above, and as a generalized example of a typical core structure such as that involved here, the narrowed read core 18 may be on the order of about half the total width of the write core 12 (for example, six to seven mils and twelve mils, respectively), the combined thickness of the write closures 20 (on both sides of the read core) will thus be on the order of about four mils (allowing approximately one-half mil for each of the isolation layers 26). While the particular number of individual write closure strips 22 which make up this total thickness is not a matter of great importance, the general arrangement illustrated (two or three such strips on each side of the read core) is believed generally representative of a good physical implementation.

The outermost (additional, or supplemental) write closure strips 24 should have an effective thickness which is determined by the extent of reduction desired in the effective total reluctance of the write closures, in order to accomplish the desired reduction of flux coupled from the write closures to the read core during read operations. One example, consistent with and corresponding to the physical example referred to above, comprises the use of one or two such additional closure strips whose thickness is on the same order as that indicated for the other such closure strips 22. It is to be noted, in this regard, that the extent to which these additional closure strips are recessed from the face of the head is preferably between about three thousandths and twenty thousandths of an inch (i.e., at least about thirty percent of the gap length, or on the order of about three times the height of the recessed write closure strips), in a head corresponding generally to the foregoing example. As will be understood, this recessed arrangement of the additional closure strips imparts a stepped configuration to the flanking strata, the height of the step corresponding to the overall thickness of the recessed strips.

By use of an additional write closure 4 in a relationship comparable to that shown in FIG. 4, and consistent with the foregoing example, read core versus write closure isolation may be reduced significantly, and may achieve isolation magnitudes on the order of at least 95%. This significantly improves the performance of the transducer involved by making it much less sensitive to adjacent track signals and other such noise which otherwise would be picked up by the write closures.

With regard to particular structural materials, the read and write cores 18 and 12, and the write closures 22 and 24 may in general be of any conventional magnetic material customarily used in transducer cores, i.e., "mu metal", ferrite, etc. The various components ("strata") constituting the different core elements may each comprise a "stack" of thin sheet-like laminae, as is often done to reduce eddy current effects, but this is not really essential in transducer cores generally, particularly where (as here) the intended application is to write and read relatively narrow and closely-spaced tracks of magnetic transitions. As will be understood, the isolation layers or elements 26 are to be of non-magnetic material, e.g. copper or brass, etc. Where the intended media is in the form of magnetic tape, the overall height of the head is preferably many times greater than the mere height of the magnetic core structure itself, and generally equals or exceeds the total width of the tape since the latter must slide lengthwise across the convex (and often curved) front face of the head during transducing operations and the tape should be supported by the head across its entire width. The opposite is generally true in floppy disc transducing procedures, wherein the pole pieces defining the gap typically form a rounded, bluntly conical projection which deforms the recording media into a complementary dimple as the media moves over the gap during recording. As already indicated above, the core structure of the present invention may be embodied in a head of that nature also, by merely using appropriate shape relationships and incorporating the basic structural attributes and concepts set forth herein.

As will be understood, since the preferred embodiment in accordance herewith refers to a transducer head for use with tape media, the overall height of the transducer head should be much higher than the mere height of a single-track core structure, such as is shown in FIG. 2, the general physical structure of the head (apart from the core) being structured according to known head-building techniques, in accordance with which a mounting block of non-magnetic material (e.g., brass) of the desired physical size for the overall head is used to mount the magnetic core components. Usually, such a mounting block takes the form of two complementary halves, which are joined together around the outside of the core structure, interstitial spaces being filled by an appropriate non-magnetic potting compound, such as epoxy, which may also be used as an exterior coating or shaping agent.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows:

1. A magnetic core structure for a transducer head particularly adapted for use in digital data storage devices, comprising: a magnetic circuit formed by magnetic core elements, said circuit having at least one gap where magnetic flux in such circuit may access magnetically-recordable data storage media; said gap having a pair of mutually-spaced sides comprising a first and a second magnetic pole structure located generally opposite one another, said pole structures having contiguous outer surfaces immediately adjacent said gap defining the face of said head; at least one of said magnetic pole structures having a layered structure comprising at least one medial strata and at least one flanking strata, said flanking strata being disposed adjacent to and overlying at least portions of said medial strata, said medial strata having a thickness at said face measured in a direction along said gap which is less than that of the other said pole structure disposed across said gap from said medial strata; isolation means comprising a nonmagnetic layer disposed between said medial strata and said flanking strata at said one pole structure, for magnetically isolating at least said portions of said medial strata from the adjacent portions of the flanking strata; said flanking strata comprising magnetic material and serving to magnetically shunt portions of said magnetic circuit formed by said medial strata by extending alongside and into magnetic communication with said medial strata at a point along said magnetic circuit which is a distance away from said one pole structure in the direction of said other pole structure, to thereby provide a parallel magnetic return; and said flanking strata comprising an elongated structure having a stepped end extremity adjacent said magnetic gap, including a first portion which is closely adjacent the face of said head and a second portion which is recessed from said face and laterally offset from said first portion, said recessed portion of said flanking strata making substantially no meaningful contribution to the effective length of said gap at said face but nonetheless reducing the effective overall magnetic reluctance of the flanking strata.

2. A magnetic core structure as defined in claim 1, wherein both of said pole structures have generally the same overall thickness measured in a direction along said gap.

3. A magnetic core structure as defined in claim 1, wherein the combined thickness of said medial strata and said flanking strata at said gap generally corresponds to the thickness of said first magnetic pole structure at the opposite side of said gap.

4. A magnetic core structure as defined in claim 3, including at least a pair of said flanking strata, each disposed on an opposite side of said medial strata and overlying a selected area thereof.

5. A magnetic core structure as defined in claim 3, wherein said at least one pole structure having said medial and flanking strata has a thickness rearwardly of said face of said head which is greater than its thickness at said face, as measured along said gap.

6. A magnetic core structure as defined in claim 3, wherein said at least one pole structure having said medial and flanking strata has a thickness rearwardly of said face of said head which is greater than that of the other one of said pole structures, as measured along said gap.

7. A magnetic core structure as defined in claim 5, including at least a pair of said flanking strata, each disposed on an opposite side of said medial strata and overlying a selected area thereof.

8. A magnetic core structure as defined in claim 1, wherein said flanking strata structure comprises a layered structure having at least two layers, one such layer being longitudinally offset from the other to provide said stepped end extremity.

9. A magnetic core structure as defined in claim 8, including at least two of said flanking strata structures, each disposed on an opposite side of said medial strata, each of said flanking strata structures comprising at least two strip-like members stacked in layered juxtaposition one upon the other with end portions of each such structure disposed generally contiguous to said magnetic gap; and at least one of said two strip-like members stacked upon one another having an end adjacent said gap recessed from the corresponding end of the other strip-like members upon which they are stacked.

10. A magnetic core structure as defined in claim 1, wherein said recessed portion is set back from said corresponding edge extremity of said medial strata a distance on the order of at least about three thousandths of an inch.

11. A magnetic core structure as defined in claim 1, wherein said recessed portion is set back from said corresponding edge extremity of said medial strata a distance corresponding to at least about thirty percent of the overall gap length.

12. A magnetic core structure as defined in claim 1, wherein said recessed portion is set back from said corresponding edge extremity of said medial strata a distance corresponding to at least about three times the height of the step at said stepped end extremity.

13. A method of reading and writing magnetic flux transitions on magnetically-recordable media, comprising the steps: transporting the recording media relative to a transducer head in a recording pass and recording flux transitions on said media during said pass by using a first portion of the transducer magnetic core structure which defines the two opposite sides of the magnetic recording gap, said first portion constituting a predetermined part of the overall length of said gap; transporting the recording media relative to said transducer head in a reproducing pass and, during said reproducing pass, reproducing the flux transitions previously recorded on said media by using a second portion of said magnetic core structure; said second portion of said core structure constituting magnetic structure forming a predetermined different portion of the overall length of said gap, whereby a different proportion of the same transducing gap is used during read operations than is used during write operations; and increasing the degree of isolation of said second portion of said magnetic core structure from said first portions of said core structure during said reproducing pass by disposing magnetic shunt means across at least part of said second portion at said gap, and recessing at least some of the end portions of said magnetic shunt means from said magnetic gap.

14. The method of reading and writing magnetic flux transitions as recited in claim 13, wherein said step of increasing isolation comprises recessing said end portions of said magnetic shunts an extent corresponding generally to at least about thirty percent of the total length of said magnetic gap.

15. The method of reading and writing magnetic flux transitions as recited in claim 14, wherein said step of increasing isolation comprises recessing said end portions of said magnetic shunts an extent corresponding generally from about at least thirty percent of the total length of said magnetic gap to about two hundred percent thereof.

16. A method of increasing the degree of isolation between the read and write portions of a "write-wide, read-narrow" magnetic transducer head of the general type, having at least one magnetic shunt juxtaposed along portions of the narrowed read core, said method comprising the step of recessing at least portions of the end extremity of said magnetic shunt nearest the magnetic gap of the transducer head away from said gap in a direction generally perpendicular thereto.

17. The method as recited in claim 16, wherein said step of recessing is accomplished by using a layered structure for said magnetic shunt and offsetting certain of the end portions of said layered structure from other such end portions.

* * * * *

UNITED STATES PATENT AND TRADEMARK OFFICE
CERTIFICATE OF CORRECTION

PATENT NO. : 4,849,841

DATED : July 18, 1989

INVENTOR(S) : Edmund L. Sokolik

It is certified that error appears in the above-identified patent and that said Letters Patent is hereby corrected as shown below:

Column 3, Line 47:

After " in" add --accordance with--;

Column 4, Line 59:

"group" should be --grouping--;

Column 5, Line 26:

"A's" should be --As--;

Column 7, Line 3:

"open area 34" should be --open area 32--;

Column 8, Line 2:

"$R_2+R_3$" should be --$R_1+R_3$--;

UNITED STATES PATENT AND TRADEMARK OFFICE
CERTIFICATE OF CORRECTION

PATENT NO. : 4,849,841

DATED : July 18, 1989

INVENTOR(S) : Edmund L. Sokolik

It is certified that error appears in the above-identified patent and that said Letters Patent is hereby corrected as shown below:

Column 8, Line 59:

"closure 4" should be --closure 24--;

Abstract, Line 3:

After "it" insert --is--.

Signed and Sealed this

Fifteenth Day of September, 1992

*Attest:*

DOUGLAS B. COMER

*Attesting Officer*     Acting Commissioner of Patents and Trademarks